US011643916B2

(12) United States Patent
Gonzales et al.

(10) Patent No.: US 11,643,916 B2
(45) Date of Patent: May 9, 2023

(54) DOWNHOLE PUMPING SYSTEM WITH CYCLONIC SOLIDS SEPARATOR

(71) Applicant: Baker Hughes Oilfield Operations LLC, Houston, TX (US)

(72) Inventors: Jose Gonzales, Fulshear, TX (US); Oscar Becerra Moreno, Calgary (CA); Reda El Mahbes, Houston, TX (US); Partha Ganguly, Sugarland, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 265 days.

(21) Appl. No.: 16/888,728

(22) Filed: May 30, 2020

(65) Prior Publication Data

US 2020/0378235 A1 Dec. 3, 2020

Related U.S. Application Data

(60) Provisional application No. 62/854,815, filed on May 30, 2019.

(51) Int. Cl.
*E21B 43/38* (2006.01)
*B01D 21/26* (2006.01)
*E21B 43/34* (2006.01)
*E21B 43/12* (2006.01)

(52) U.S. Cl.
CPC ............ *E21B 43/38* (2013.01); *B01D 21/267* (2013.01); *E21B 43/128* (2013.01); *E21B 43/35* (2020.05)

(58) Field of Classification Search
CPC ........ E21B 43/38; E21B 43/128; E21B 43/35; B01D 21/267
See application file for complete search history.

(56) References Cited

U.S. PATENT DOCUMENTS

| 2,355,259 | A | 8/1944 | Cotesworth et al. |
| 2,929,501 | A | 3/1960 | Fenske et al. |
| 3,986,552 | A | 10/1976 | Scott |
| 4,253,481 | A | 3/1981 | Sarlls |
| 5,271,725 | A | 12/1993 | Freet et al. |
| 5,344,269 | A | 9/1994 | Banks |
| 5,433,269 | A | 7/1995 | Hendrickson |
| 5,553,669 | A | 9/1996 | Trainer |

(Continued)

FOREIGN PATENT DOCUMENTS

| CN | 108386160 A | | 8/2018 | |
| GB | 2365046 A | * | 2/2002 | ......... B01D 21/2455 |
| WO | 2012169904 A2 | | 12/2012 | |

OTHER PUBLICATIONS

ISA/US; Search Report and Written Opinion for PCT/US2020/35480; dated Sep. 8, 2020.

*Primary Examiner* — Robert E Fuller
(74) *Attorney, Agent, or Firm* — Crowe & Dunlevy, P.C.

(57) ABSTRACT

A pumping system is configured to be deployed in a well that has a vertical portion and a lateral portion. The pumping system includes a pump positioned in the vertical portion, a velocity tube assembly that extends from the vertical portion into the lateral portion and a cyclonic solids separator connected between the pump and the velocity tube assembly. The cyclonic solids separator includes a housing, a discharge manifold extending through the housing, and a plurality of ejection ports that extend through the discharge manifold along arcuate, tangential paths.

18 Claims, 4 Drawing Sheets

(56) References Cited

U.S. PATENT DOCUMENTS

| | | |
|---|---|---|
| 5,660,533 A | 8/1997 | Cartwright |
| 6,126,416 A | 10/2000 | Lee |
| 6,186,227 B1 | 2/2001 | Vaynshteyn et al. |
| 6,315,050 B2 | 11/2001 | Vaynshteyn et al. |
| 6,564,876 B2 | 5/2003 | Vaynshteyn et al. |
| 6,899,176 B2 | 5/2005 | Hailey et al. |
| 7,387,158 B2 | 6/2008 | Murray et al. |
| 7,552,777 B2 | 6/2009 | Murray et al. |
| 7,713,035 B2 | 5/2010 | Ford |
| 8,322,450 B2 | 12/2012 | Meijer |
| 8,584,744 B2 | 11/2013 | Soni et al. |
| 8,998,586 B2 | 4/2015 | Muhs |
| 9,447,661 B2 | 9/2016 | Broussard et al. |
| 9,447,788 B2 | 9/2016 | Henry et al. |
| 2002/0023750 A1 | 2/2002 | Lopes et al. |
| 2004/0020638 A1 | 2/2004 | Williams |
| 2004/0129432 A1 | 7/2004 | Wills et al. |
| 2004/0131488 A1 | 7/2004 | Locher |
| 2005/0199551 A1 | 9/2005 | Gordon |
| 2005/0281683 A1 | 12/2005 | Brown et al. |
| 2008/0093085 A1 | 4/2008 | Knight et al. |
| 2008/0110614 A1 | 5/2008 | Orban |
| 2009/0065202 A1 | 3/2009 | Brown et al. |
| 2010/0175869 A1 | 7/2010 | Cobb |
| 2010/0206732 A1 | 8/2010 | Hale |
| 2011/0024119 A1 | 2/2011 | Wolf et al. |
| 2011/0180272 A1 | 7/2011 | Head |
| 2012/0057965 A1 | 3/2012 | Bergamini et al. |
| 2013/0025865 A1 | 1/2013 | Knobloch et al. |
| 2013/0068455 A1 | 3/2013 | Brown et al. |
| 2013/0075105 A1 | 3/2013 | Morton |
| 2013/0306330 A1 | 11/2013 | Bishop et al. |
| 2014/0332239 A1 | 11/2014 | Porta |
| 2015/0053394 A1 | 2/2015 | Reid et al. |
| 2015/0075772 A1* | 3/2015 | Saponja ............... E21B 43/10 166/115 |
| 2015/0098840 A1 | 4/2015 | Kowalchuk |
| 2015/0167652 A1 | 6/2015 | Van et al. |
| 2015/0204158 A1 | 7/2015 | Frisby et al. |
| 2015/0205158 A1 | 7/2015 | Engel et al. |
| 2015/0275619 A1 | 10/2015 | Slup |
| 2015/0345276 A1 | 12/2015 | Jensen |
| 2016/0003031 A1 | 1/2016 | Xin et al. |
| 2016/0130919 A1 | 5/2016 | Vasques |
| 2016/0222770 A1 | 8/2016 | Kirk et al. |
| 2017/0175468 A1 | 6/2017 | Vail III, et al. |
| 2017/0241215 A1 | 8/2017 | Kleppa |
| 2017/0292361 A1 | 10/2017 | Beauquin et al. |
| 2017/0342798 A1 | 11/2017 | Wutherich |
| 2018/0112509 A1 | 4/2018 | Saponja et al. |
| 2018/0171763 A1 | 6/2018 | Malbrel et al. |
| 2018/0179852 A1 | 6/2018 | Hou et al. |
| 2018/0223642 A1 | 8/2018 | Zahran |
| 2018/0298736 A1 | 10/2018 | Bailey et al. |

\* cited by examiner

DOWNHOLE PUMPING SYSTEM WITH CYCLONIC SOLIDS SEPARATOR

RELATED APPLICATIONS

This application claims the benefit of U.S. Provisional Patent Application Ser. No. 62/854,815 filed May 30, 2019 entitled "Downhole Pumping System with Cyclonic Solids Separator," the disclosure of which is herein incorporated by reference.

FIELD OF THE INVENTION

This invention relates generally to the field of oil and gas production, and more particularly to downhole phase separation systems for improving the recovery of oil and gas from a well.

BACKGROUND

Hydrocarbon fluids produced from subterranean wells often include liquids and gases. Although both may be valuable, the multiphase flow may complicate recovery efforts. For example, naturally producing wells with elevated gas fractions may overload phase separators located on the surface. This may cause gas to be entrained in fluid product lines, which can adversely affect downstream storage and processing.

In wells in which artificial lift solutions have been deployed, excess amounts of gases and solids in the wellbore fluid can present problems for downhole equipment that is primarily designed to produce liquid-phase products. In particular, a high gas-to-liquid ratio ("GLR") may adversely impact efforts to recover liquid hydrocarbons with pumping equipment. Liquid "slugging" occurs when large pockets of gas alternated with liquid slugs develop while the fluid flows to surface.

The centrifugal forces exerted by downhole turbomachinery tend to separate gas from liquid, thereby increasing the chances of gas interference or vapor lock. Downhole gas separators have been used to remove gas before the wellbore fluids enter the pump. In operation, wellbore fluid is drawn into the gas separator through an intake. A lift generator provides additional lift to move the wellbore fluid into an agitator. The agitator is typically configured as a rotary paddle that imparts centrifugal force to the wellbore fluid. As the wellbore fluid passes through the agitator, heavier components, such as oil and water, are carried to the outer edge of the agitator blade, while lighter components, such as gas, remain close to the center of the agitator. In this way, modern gas separators take advantage of the relative difference in specific gravities between the various components of the two-phase wellbore fluid to separate gas from liquid. Once separated, the liquid can be directed to the pump assembly and the gas vented from the gas separator.

Although generally effective, these prior art gas downhole gas separators incorporate the use of a driven rotational shaft that may not be present in certain applications. Additionally, existing gas separation equipment may be ineffective at reducing the concentration of solid particles entrained within the gas and liquid stream. There is, therefore, a need for an improved gas separator system that provides gas separation functionality over an extended range of applications.

SUMMARY OF THE INVENTION

In one aspect, embodiments of the present invention include a pumping system is configured to be deployed in a well that has a vertical portion and a lateral portion. The pumping system includes an electric submersible pump positioned in the vertical portion, a velocity tube assembly that extends from the vertical portion into the lateral portion and a cyclonic solids separator connected between the electric submersible pump and the velocity tube assembly. The cyclonic solids separator includes a housing, a discharge manifold extending through the housing, and a plurality of ejection ports that extend through the discharge manifold along arcuate, tangential paths.

In another aspect, embodiments of the present invention include a pumping system configured to be deployed in a well that has a vertical portion and a lateral portion. In these embodiments, the pumping system includes a pump positioned in the vertical portion. The pump has an inverted shroud and a downhole reciprocating pump. The downhole reciprocating pump includes a traveling valve, a standing valve, and an intake tube that extends into the inverted shroud. The pumping system also includes a velocity tube assembly that extends from the vertical portion into the lateral portion and a cyclonic solids separator connected between the pump and the velocity tube assembly. The cyclonic solids separator includes a conical housing, a discharge manifold extending through the housing, and a plurality of ejection ports that extend through the discharge manifold along arcuate paths.

In yet another embodiment, the present invention includes a pumping system configured to be deployed in a well that has a vertical portion and a lateral portion. The pumping system has a pump positioned in the vertical portion. In this embodiment, the pump has a motor, a gas separator driven by the motor, and a rotary pump driven by the motor. The pump receives fluid from the gas separator. The pumping system also includes a velocity tube assembly that extends from the vertical portion into the lateral portion, and a cyclonic solids separator connected between the pump and the velocity tube assembly. The cyclonic solids separator has a conical housing, a discharge manifold extending through the housing, and a plurality of ejection ports that extend through the discharge manifold along arcuate paths.

WRITTEN DESCRIPTION

As used herein, the term "petroleum" refers broadly to all mineral hydrocarbons, such as crude oil, gas and combinations of oil and gas. The term "fluid" refers generally to both gases and liquids, and "two-phase" or "multiphase" refers to a fluid that includes a mixture of gases and liquids. It will be appreciated by those of skill in the art that in the downhole environment, such fluids may also carry entrained solids and suspensions. Accordingly, as used herein, the terms "two-phase" and "multiphase" are not exclusive of fluids that may also contain liquids, gases, solids, or other intermediary forms of matter.

Figure 1:
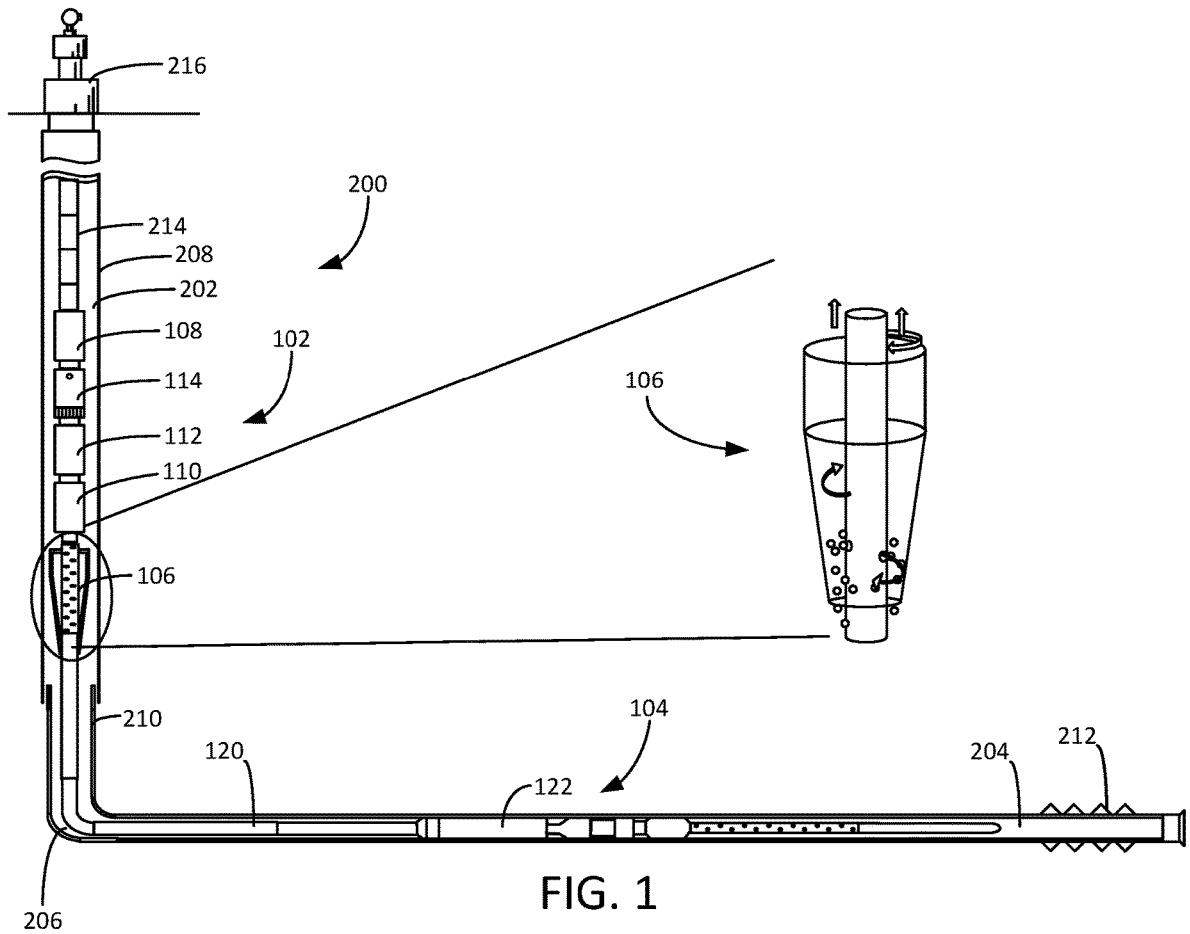
FIG. 1 is a side view of an electric submersible pumping system deployed in a well, showing a close-up view of the cyclonic solids separator.
Figure 3:
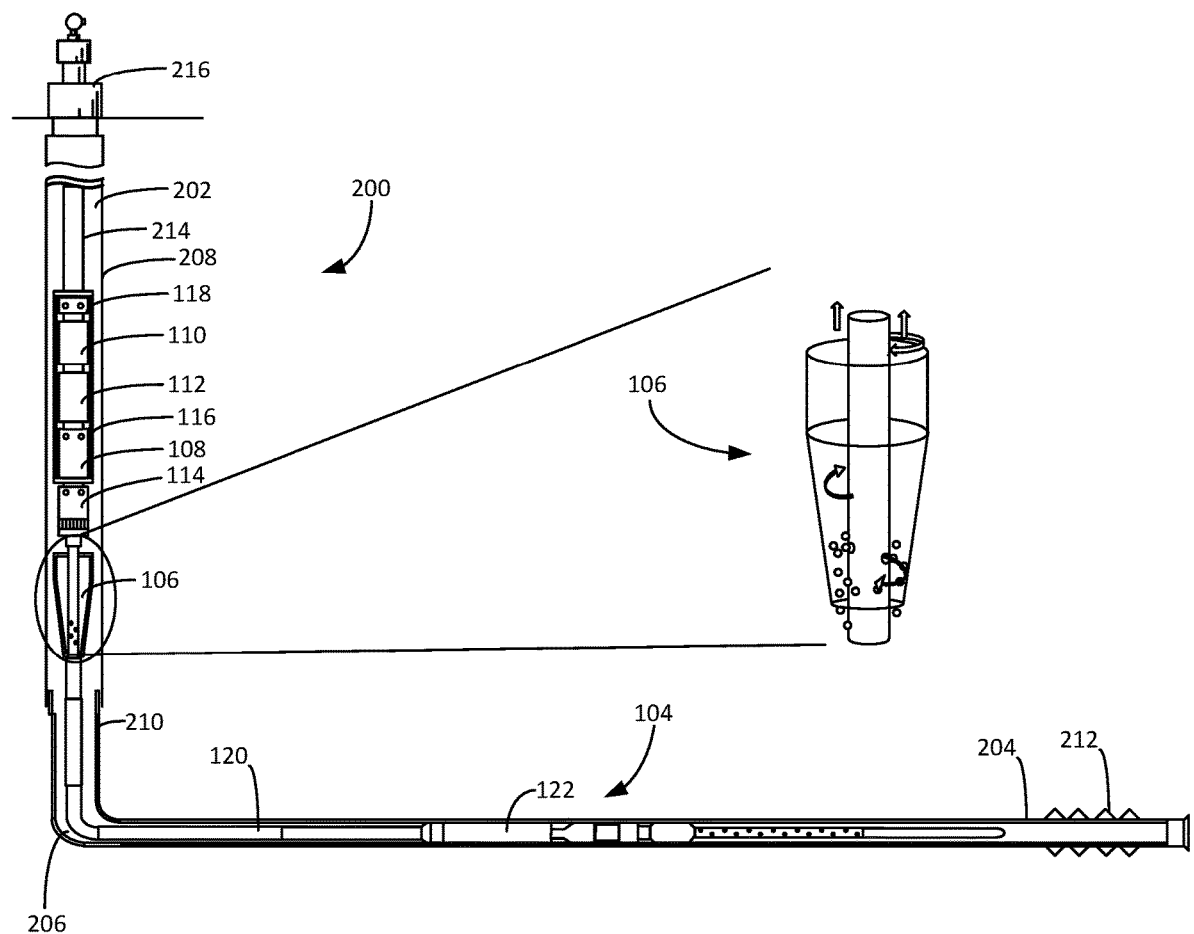
FIG. 3 is a side view of an alternate embodiment of the electric submersible pump system of FIG. 1.

Referring to FIGS. 1 and 3, shown therein is a pumping system 100 deployed in a well 200 that includes a vertical portion 202, a lateral portion 204 and a heel portion 206. The well 200 includes a casing 208 and a production liner 210. The well 200 includes perforations 212 that admit fluids from an adjacent geologic formation into the production liner 210 and well casing 208. Although the well 200 has been depicted as a lateral or deviated well, it will be appreciated that the pumping system 100 can also be deployed in conventional wells and wells that include non-vertical and non-lateral legs. The well 200 includes production tubing 214 that is suspended from a wellhead 216. The production tubing 214 connects an electric submersible pump 102 to the wellhead 216. The wellhead 216 provides a mechanism for throttling or closing the well 200 and for connecting the well 200 to surface separators, storage equipment or downstream processing facilities.

The pumping system 100 includes a pump 102, a velocity tube assembly 104 and a cyclonic solids separator 106. Although other configurations are contemplated by exemplary embodiments, the pump 102 depicted in FIG. 1 includes a rotary pump 108, an electric motor 110, a seal section 112 and a gas separator 114. The pumping system 100 is primarily designed to pump petroleum products, but it will be understood that the pumping system 100 can also be used to move other fluids.

The motor 110 is configured to drive the rotary pump 108. Power is provided to the motor 110 through a power cable (not shown). In exemplary embodiment, the rotary pump 108 is a turbomachine that uses one or more impellers and diffusers to convert mechanical energy into fluid pressure head. In other embodiments, the rotary pump 108 is a positive displacement pump or progressive cavity pump (PCP). In these embodiments, the rotary pump can be driven by the submersible motor 110 or by a surface-based motor that transfers torque to the rotary pump 108 through a rotating rod or linkage. In each case, the rotary pump 108 forces the wellbore fluids to the surface through the production tubing 214.

The gas separator 114 removes a portion of the gas from the fluid adjacent the rotary pump 108 and provides the rotary pump 108 with fluid that has a reduced gas fraction. The gas separator 114 includes an intake and one or more internal rotating paddles, blades or other agitators that aid in the separation of the liquid and gas phases. The liquid-enriched discharge from the gas separator 114 is provided to the rotary pump 108, typically through a closed, direct conduit, while the gaseous components are expelled by the gas separator into the annulus of the well 200.

The seal section 112 is positioned above the motor 110 and below the rotary pump 108. The seal section 112 isolates the motor 110 from wellbore fluids in the rotary pump 108, while accommodating the thermal expansion and contraction of lubricants within the motor 110. The seal section 112 may optionally be provided with thrust bearings that mitigate the effects of axial thrust produced along the driveline between the motor 110 and the rotary pump 108. Although only one of each component of the electric submersible pump 102 is shown, it will be understood that more can be connected when appropriate, that other arrangements of the components are desirable and that these additional configurations are encompassed within the scope of exemplary embodiments. For example, in many applications, it is desirable to use tandem-motor combinations, gas separators, multiple seal sections, multiple pumps, sensor modules and other downhole components.

The electric submersible pump 102 depicted in FIG. 1 is configured such that the motor 110 is positioned below the rotary pump 108. In the embodiment depicted in FIG. 3, however, portions of the electric submersible pump 102 are contained within a closed shroud 116. The motor 110 and rotary pump 108 are both enclosed within the shroud 116, with the motor 110 located above the rotary pump 108. In this embodiment, the gas separator 114 is positioned below the shroud 116 and is configured to expel gas into the annulus of the well 200 around the outside of the shroud 116. The gas separator 114 provides a liquid-enriched stream through the bottom of the shroud 116 directly to the intake stages of the rotary pump 108, which in turn discharges the pressurized fluid inside the shroud 116 to cool the motor 110. An intake or crossover 118 above the motor 110 conveys the pressurized fluid to the production tubing 214 through the upper end of the closed shroud 116. In this way, the pumped fluid passes over the exterior of the motor 110 to convectively cool the motor 110 during operation.

The velocity tube assembly 104 extends from the vertical portion 202 into the lateral portion 204 of the well 200. The velocity tube assembly 104 includes a velocity string 120, a packer system 122 and an inlet joint 124. The inlet joint 124 is a perforated joint that allows liquids, gases and solids to enter the velocity tube assembly 104. In other embodiments, the inlet joint 124 may include screens that restrict larger particles from entering the velocity tube assembly 104. The relatively narrow inside diameter of the velocity string 120 causes the wellbore fluids to accelerate through the velocity tube assembly 104.

The packer system 122 includes one or more isolation devices that prevent formation fluids from passing along the outside of the velocity tube assembly 104. In this way, the fluids are forced into the velocity tube assembly 104 through the inlet joint 124. In exemplary embodiments, the packer system 122 includes a tension set or hydraulically set packer (not separately designated) that can be retracted from the casing 208 or production liner 210 by releasing tension on the packer system 122. The packer system 122 may also include breakaway joints that allow the pumping system 102 to be disconnected from the velocity tube assembly 104 in the event the velocity tube assembly 104 or the packer 122 is jammed in the lateral portion 204 of the well 200.

Figure 2:
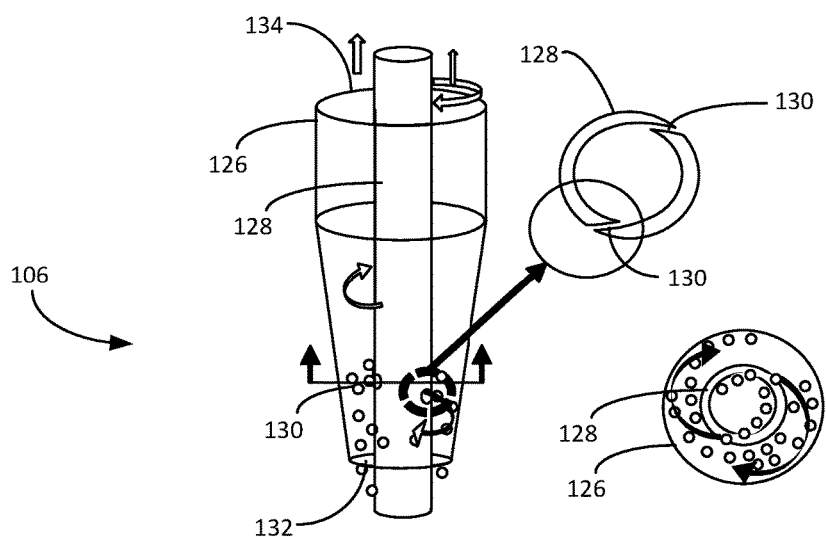
FIG. 2 is a close-up view of the cyclonic solids separator from the electric submersible pumping system of FIG. 1 that includes cross-sectional representations of the discharge manifold and ejection ports.

The velocity string 120 is connected to the cyclonic solids separator 106. The cyclonic solids separator 106 includes a conical housing 126 and a discharge manifold 128 that extends through the central portion of the conical housing 126. The discharge manifold 128 is a perforated joint that includes a plurality of ejection ports 130, as best seen in FIGS. 1 and 2, which is connected to the velocity string 120. The discharge manifold 128 may have a closed upper end that forces the ejection of liquids, gases and solids from the velocity string 120 through the ejection ports 130 into the internal separator annulus between the discharge manifold 128 and the conical housing 126 of the cyclonic solids separator 106.

The ejection ports 130 extend through the discharge manifold 128 along tangential, arcuate paths that encourage a clockwise or counterclockwise rotation in the fluid within the conical housing 126. The tapered profile of the conical housing 126 encourages the rotation of fluids and solids expelled from the discharge manifold 128. The smaller cross-sectional area near the bottom of the conical housing 126 generally increases the angular or tangential velocity of the multiphase fluids leaving the discharge manifold 128, which encourages centrifugal separation of the various phases based on differences in density. The conical housing 126 optionally includes internal spiraled ribs or fighting that promotes the rotational movement of fluids passing through the cyclonic solids separator. The flighting can be secured to the internal surface of the conical housing 126 such that the fighting is arranged as a substantial continuation of the flow path produced by the ejection ports 130, while including gapped "drop outs" that encourage solid particles to fall through the bottom of the conical housing 126.

The conical housing 126 has an open bottom 132 and an open top 134. The open bottom 132 that permits solids and heavier fluids expelled from the discharge manifold 128 and separated from lighter components to fall out of the cyclonic solids separator 106. The fluid rotation induced by the cyclonic solids separator 106 encourages solids and heavier fluids to spin outward toward the conical housing 126, while lighter gasses and fluids tend to accumulate closer to the discharge manifold 128 extending along the central longitudinal axis of the cyclonic solids separator 106. The lighter gases and fluids are allowed to exit the cyclonic solids separator 106 through the open top 134, where they are picked up by the gas separator 114 or rotary pump 108.

In this way, the cyclonic solids separator 106 is configured to passively separate solid particles from lighter fluids and expel those solid particles through the open bottom 132 of the cyclonic solids separator 106. Removing sand and other solids from the fluid stream passed to the electric submersible pump 102 reduces wear on the pump 108 and other components of the electric submersible pump 102. Because the cyclonic solids separator 106 does not include motorized or driven parts, the cyclonic solids separator 106 can be positioned in a wide range of locations within the well 200 without a connection to power or a prime mover.

Figure 4:
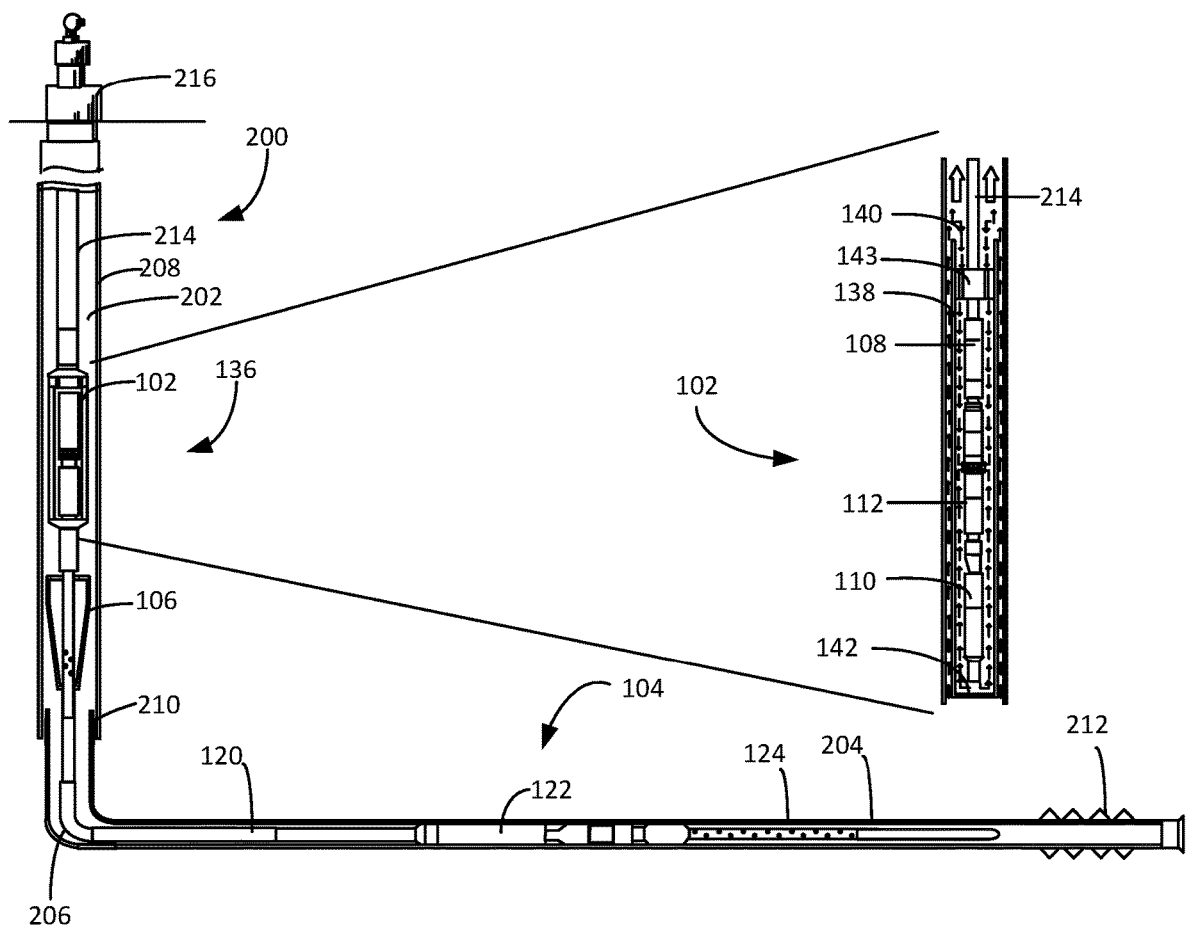
FIG. 4 is a side view of an embodiment in which the cyclonic solids separator is separator used in connection with a gas-mitigated electric submersible pump.

In another embodiment depicted in FIG. 4, the cyclonic solids separator 106 and velocity tube assembly 104 are used in connection with a gas-mitigated pumping system 136 in which the electric submersible pump 102 is contained within an inverted shroud 138. The electric submersible pump 102 (which includes the rotary pump 108, the motor 110, and the seal section 112) is located in the inverted shroud 138. The inverted shroud 138 functions as a gas mitigation canister and includes an open upper end 140 that admits fluids from the well 200 into the inverted shroud 138. The inverted shroud 138 has a closed lower end 142 so that all of the fluids admitted to the inverted shroud 138 pass through the open upper end 140. The inverted shroud 138 includes a shroud hanger 143 that secures the inverted shroud 138 to the production tubing 214.

As best illustrated in the close-up view in FIG. 4, fluids discharged from the cyclonic solids separator 106 pass within the narrow external annular space between the outside of the inverted shroud 138 and the casing 208. Gases tend to continue rising through the well 200, while liquids fall through the open upper end 140 and shroud hanger 142 into the internal annular space between the inside of the inverted shroud 138 and the various components of the electric submersible pump 102.

Thus, placing the rotary pump 108 below the open upper end 140 of the inverted shroud 138 encourages lighter fluids and gases to continue moving upward through the well 200 while permitting heavier fluids to concentrate inside the inverted shroud 138. In this way, the counter-current flow of liquids into the inverted shroud 138 reduces the gas fraction of the fluids drawn into the rotary pump 108. The inverted shroud 138 is sized to retain a sufficient quantity of liquid to allow the electric submersible pump 102 to continue running in the event a large gas slug is encountered in the well 200.

In some embodiments, the inverted shroud 138 is configured to provide the electric submersible pump 102 with a fluid reserve of between about 0.25 barrel and 1 barrel under normal operating conditions. If a large gas slug passes through the velocity tube assembly 104 and the cyclonic solids separator 106, the gas will bypass the inverted shroud 138 and continue moving upward in the well 200, while the electric submersible pump 102 continues to run with the fluid reserve contained within the inverted shroud 138. Once the gas slug has passed, the normal production of fluid into the well 200 will replace the reserved fluid pumped from inside the inverted shroud 138 during the gas slugging event. The length and other dimensions of the inverted shroud 138 can be configured during manufacturing based on the expected slug volume, rate and frequency. A longer inverted shroud 138 will provide a larger buffer to withstand longer gas slugging events.

Figure 5:
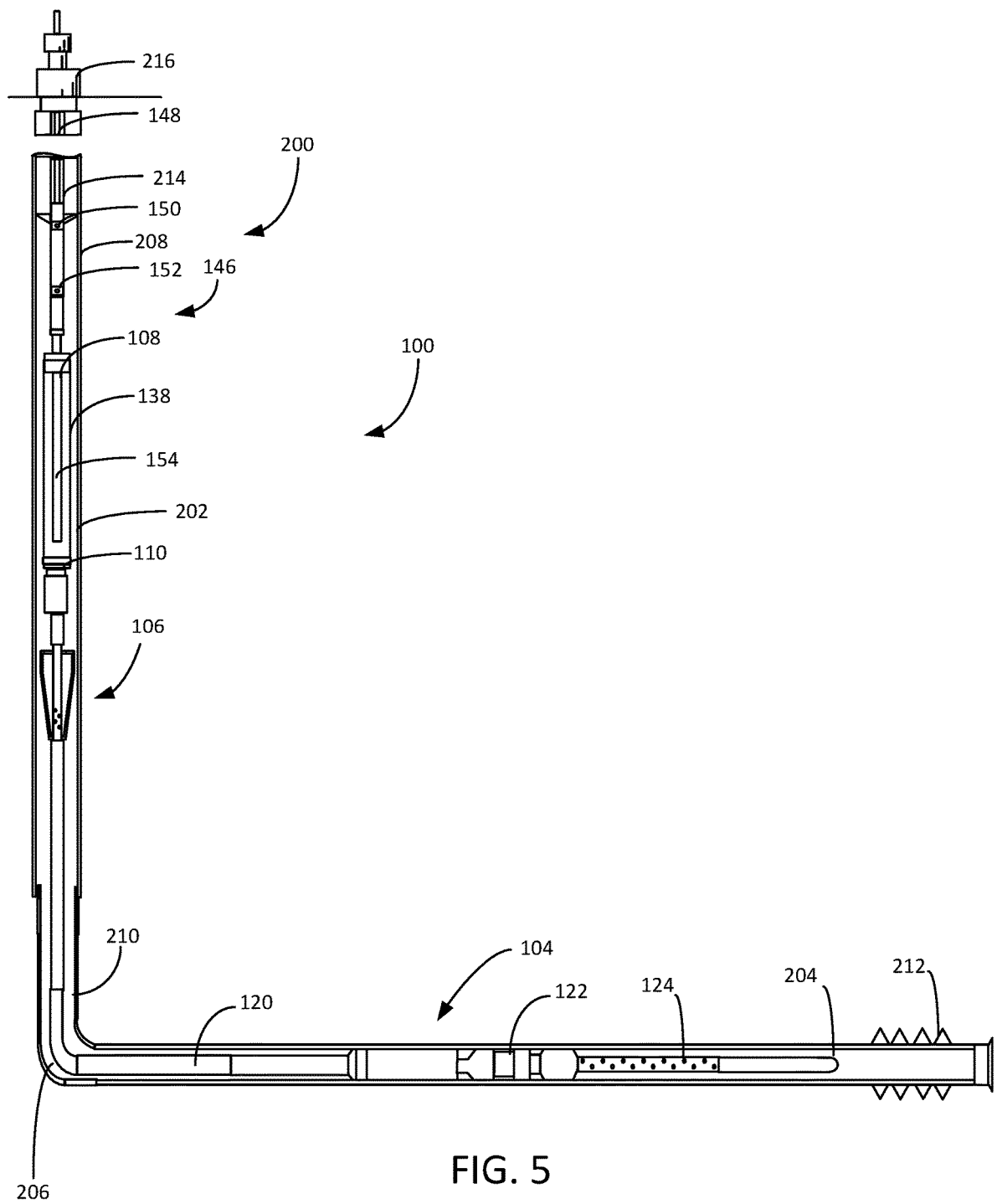
FIG. 5 is a side view of an embodiment in which the cyclonic solids separator is used in connection with a reciprocating pump.

In yet another embodiment, the cyclonic solids separator 106 and velocity tube assembly 104 are used in connection with a downhole reciprocating pump 146. As depicted in FIG. 5, the downhole reciprocating pump 146 is positioned in the vertical portion 202 of the casing 208. The reciprocating pump 146 is actuated by a reciprocating rod string 148 that is driven by a surface-mounted rod lift unit (not shown). The reciprocating pump 146 includes a traveling valve 150, a standing valve 152 and an intake tube 154. As depicted in FIG. 5, the reciprocating pump 146 is landed above the inverted shroud 138 and the intake tube 154 extends down into the inverted shroud 138 to supply fluid to the reciprocating pump 146. In other embodiments, the reciprocating pump 146 is landed inside the reciprocating shroud 138. In yet other embodiments, the standing valve 152 and other stationary components of the reciprocating pump 146 are positioned inside the inverted shroud 138 with the reciprocating components positioned above the inverted shroud 138.

Although the velocity tube assembly 104 and cyclonic solids separator 106 have been disclosed in connection with a reciprocating pump 146 and an electric submersible pump 102, the use of other downhole pumps in combination with the velocity tube assembly 104 and cyclonic solids separator 106 are contemplated as additional embodiments.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A pumping system configured to be deployed in a well that has a vertical portion and a lateral portion, wherein the pumping system comprises:
 a pump positioned in the vertical portion;
 a velocity tube assembly that extends from the vertical portion into the lateral portion; and a cyclonic solids separator connected between the pump and the velocity tube assembly, wherein the cyclonic solids separator comprises:
 a conical housing;
 a discharge manifold connected to the velocity tube assembly and extending into the conical housing; and
 a plurality of ejection ports that extend through the discharge manifold along arcuate paths, wherein the plurality of ejection ports are configured to discharge fluids and solids into the conical housing.

2. The pumping system of claim 1, wherein the conical housing has an open top and an open bottom.

3. The pumping system of claim 2, wherein the conical housing has a smaller outer diameter near the open bottom and a larger outer diameter near the open top.

4. The pumping system of claim 1, wherein the pump is an electric submersible pump that comprises:
 a motor;
 a gas separator driven by the motor; and
 a pump driven by the motor, wherein the pump receives fluid from the gas separator.

5. The pumping system of claim 4, wherein the pump further comprises a shroud and wherein the motor and pump are positioned inside the shroud.

6. The pumping system of claim 5, wherein the gas separator is positioned outside the shroud.

7. The pumping system of claim 1, further comprising an inverted shroud, wherein the inverted shroud comprises:
 a shroud hanger;
 an open upper end; and
 a closed lower end.

8. The pumping system of claim 7, wherein the pump is a downhole reciprocating pump that includes a traveling valve, a standing valve and an intake tube, wherein the intake tube extends into the inverted shroud through the open upper end.

9. The pumping system of claim 7, wherein the pump is an electric submersible pump that includes a motor and a centrifugal pump driven by the motor, and wherein the motor and the centrifugal pump are contained within the inverted shroud.

10. The pumping system of claim 1, wherein the velocity tube assembly comprises:
 a velocity string;
 an inlet joint; and
 a packer system between the velocity string and the inlet joint.

11. A pumping system configured to be deployed in a well that has a vertical portion and a lateral portion, wherein the pumping system comprises:
 a pump positioned in the vertical portion, wherein the pump comprises:
  a motor;
  a gas separator driven by the motor; and
  a rotary pump driven by the motor, wherein the pump receives fluid from the gas separator;
 a velocity tube assembly that extends from the vertical portion into the lateral portion; and
 a cyclonic solids separator connected between the pump and the velocity tube assembly, wherein the cyclonic solids separator comprises:
  a conical housing;
  a discharge manifold connected to the velocity tube assembly and extending through the housing; and
  a plurality of ejection ports that extend through the discharge manifold along arcuate paths, wherein the plurality of ejection ports are configured to discharge fluids and solids from the discharge manifold into the conical housing.

12. The pumping system of claim 11, wherein the pump further comprises a shroud and wherein the motor and rotary pump are positioned inside the shroud.

13. The pumping system of claim 11, further comprising an inverted shroud, wherein the inverted shroud comprises:
 a shroud hanger;
 an open upper end; and
 a closed lower end.

14. The pumping system of claim 13, wherein the motor and the rotary pump are positioned inside the inverted shroud.

15. A pumping system configured to be deployed in a well that has a vertical portion and a lateral portion, wherein the pumping system comprises:
 a pump positioned in the vertical portion, wherein the pump comprises:
  an inverted shroud; and
  a downhole reciprocating pump, wherein the downhole reciprocating pump comprises:
   a traveling valve;
   a standing valve; and
   an intake tube, wherein the intake tube extends into the inverted shroud;
 a velocity tube assembly that extends from the vertical portion into the lateral portion; and
 a cyclonic solids separator connected between the pump and the velocity tube assembly, wherein the cyclonic solids separator comprises:
  a conical housing;
  a discharge manifold connected to the velocity tube assembly and extending into the conical housing; and
  a plurality of ejection ports that extend through the discharge manifold along arcuate paths, wherein the plurality of election ports are configured to discharge fluids and solids into the conical housing.

16. The pumping system of claim 15, wherein the inverted shroud comprises:
 a shroud hanger;
 an open upper end; and
 a closed lower end.

17. The pumping system of claim 15, wherein the downhole reciprocating pump further comprises a rod string that is drive by a surface-based pumping unit.

18. The pumping system of claim 15, wherein the velocity tube assembly comprises:
 a velocity string;
 an inlet joint; and
 a packer system between the velocity string and the inlet joint.

* * * * *